United States Patent [19]

Tokuda

[11] Patent Number: 5,608,456
[45] Date of Patent: Mar. 4, 1997

[54] IMAGE SENSOR USED WITH SUBSTANTIALLY MONOCHROMATIC ILLUMINATING LIGHT OF HIGH COHERENCE FOR PREVENTING OR REDUCING INTERFERENCE FRINGES

[75] Inventor: Noriaki Tokuda, Kanagawa-ken, Japan

[73] Assignee: Nikon Corporation, Tokyo, Japan

[21] Appl. No.: 307,080

[22] Filed: Sep. 16, 1994

[30] Foreign Application Priority Data

Sep. 21, 1993 [JP] Japan .................................. 5-234840

[51] Int. Cl.$^6$ .................................................. H04N 5/225
[52] U.S. Cl. ......................... 348/340; 348/374; 359/601; 257/436
[58] Field of Search ..................... 348/335, 340, 348/373, 374, 375, 241, 607, 614; 359/580, 601, 608, 609; 257/436, 437; H04N 5/217, 5/225

[56] References Cited

U.S. PATENT DOCUMENTS

| | | | |
|---|---|---|---|
| 4,594,613 | 6/1986 | Shinbori | 358/213 |
| 4,649,088 | 3/1987 | Mitsui | 428/697 |
| 4,896,217 | 1/1990 | Miyazawa | 1/213.11 |
| 5,009,486 | 4/1991 | Dobrowolski | 350/164 |
| 5,051,328 | 9/1991 | Andrews | 430/56 |
| 5,202,939 | 4/1993 | Belleville | 385/12 |
| 5,369,266 | 11/1994 | Nohda | 250/208.1 |

*Primary Examiner*—John K. Peng
*Assistant Examiner*—Ngoc-Yen Vu
*Attorney, Agent, or Firm*—Armstrong, Westerman, Hattori, McLeland & Naughton

[57] ABSTRACT

An image sensor prevented from detecting interference fringes even if illuminating light of high coherence is used. The image sensor has a light-receiving element and a protective member (lid), which are integrally secured to a package. An anti-reflection coating for illuminating light is formed on the surface of the light-receiving element, or the distance between the surface of the light-receiving element and the light-receiving element-side surface of the lid is determined to be not shorter than a half of the coherence length of the illuminating light. Alternatively, the protective member is inclined with respect to the surface of the light-receiving element. Since the image sensor detects no interference fringes, it is possible to improve the accuracy of observation, image processing and measurement, etc.

2 Claims, 10 Drawing Sheets

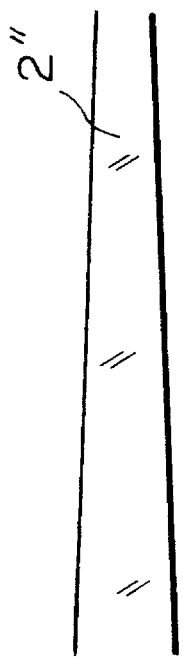
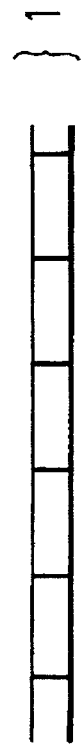
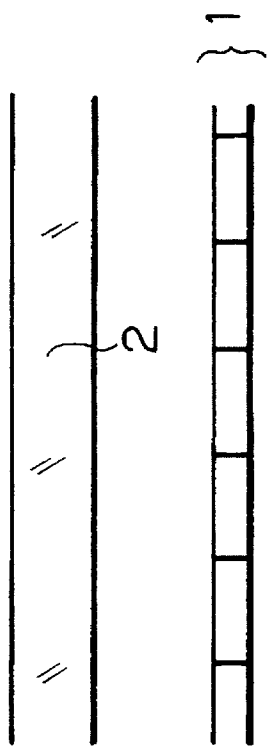
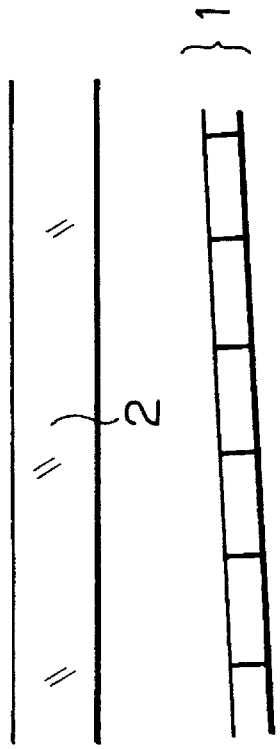
Fig. 5(a)  Fig. 5(b)  Fig. 5(c)

$p \approx \lambda / 2\theta_o$

IMAGE SENSOR USED WITH SUBSTANTIALLY MONOCHROMATIC ILLUMINATING LIGHT OF HIGH COHERENCE FOR PREVENTING OR REDUCING INTERFERENCE FRINGES

BACKGROUND OF THE INVENTION

1. Field of the Invention

The present invention relates to an image sensor which may be used in, for example, an image processing apparatus. More particularly, the present invention relates to an image sensor which is suitable for use in an apparatus that utilizes illuminating light of high coherence, e.g., laser light.

2. Description of the Related Art

FIG. 8 shows an external appearance of a CCD image sensor, which is a typical image sensor, and FIG. 9 shows a cross-sectional structure of the image sensor shown in FIG. 8. Referring to FIGS. 8 and 9, a CCD image sensing element (hereinafter referred to as "light-receiving element") 1 is formed with a light-receiving photodiode array or the like. The light-receiving element 1 is accommodated in a package 3 formed of a resin or ceramic material. The package 3 is substantially closed up with a cover glass (hereinafter referred to as "lid") 2 for protecting the light-receiving element 1. The lid 2 is a parallel-sided flat plate glass of about 1 mm in thickness, which is secured to the package 3 approximately parallel (horizontally) to the surface of the light-receiving element 1.

In general, both the obverse and reverse surfaces of the lid 2 are formed with anti-reflection coatings (thin film coatings) for preventing reflection of light in the wavelength region of illuminating light which is to be detected by the image sensor in order to reduce reflection loss at the glass surfaces (i.e., about 4% per surface). Thus, the surface reflectivity is held down to less than 1% per surface. On the other hand, the surface of the light-receiving element 1 is not particularly provided with anti-reflection coating aimed at a specific wavelength. Therefore, if the light-receiving element 1 is a device fabricated on a silicon wafer, for example, the surface of the element 1 has a surface reflectivity of about 50 to 60% for light in the wavelength range of from the visible region to the ultraviolet region.

However, in a case where an image sensor having the above-described arrangement is used in an apparatus designed to observe an object by utilizing substantially monochromatic illuminating light of high coherence, e.g., laser light, interference fringes are superimposed on an image which is to be observed, constituting an obstacle to observation or image processing and measurement. The way in which interference fringes are formed on the light-receiving element 1 will be explained below in detail with reference to FIG. 10. For the sake of simplicity, it is assumed in FIG. 10 that the lid 2 is a plane 2', and the light-receiving element 1 has a flat surface 1' without projections or the like, and that the two members are fixed at a very small angle of inclination θ° (unit: rad) with respect to each other.

The image sensor receives light passing through the lid 2 with the light-receiving element 1. Accordingly, as shown in FIG. 10, interference fringes are formed on the light-receiving surface 1' by interference between a light beam 4, which passes through the lid surface 2' and is reflected at the light-receiving element surface (light-receiving surface) 1' and further reflected at the lid surface 2' and then reaches the light-receiving surface 1', and a light beam 5 which passes through the lid surface 2' and directly reaches the light-receiving surface 1'. Although in FIG. 10 and the figures used in the following description, the light beams 4 and 5 are shown at a tilt to the light-receiving element surface 1' for the sake of convenience, it should be noted that the light beams 4 and 5 are approximately perpendicularly incident on the light-receiving surface 1' in actual practice. FIG. 11 shows the contents of FIG. 10 in more detail. As shown in FIG. 11, the light beam 4 is incident on the lid 2' and perpendicularly reflected at the light-receiving element surface 1' and further reflected at the lid surface 2' at an angle of 2θ° and then incident on the light-receiving element surface 1' at the angle of 2θ°, as has been described above. This is because the lid surface 2' is inclined at the angle of θ°.

The interference fringes are known as Fizeau fringes, and the fringe contrast depends on ① the surface reflectivity $R_L$ of the lid surface, ② the surface reflectivity $R_I$ of the light-receiving element, and ③ the coherence of the laser light used. The pitch p of the interference fringes is determined by a relationship such as that shown in FIG. 12. Referring to FIG. 12, the light beam 4 (i.e., the wavefront thereof) passes through the lid 2 and is reflected at the light-receiving element surface 1' and also at the lid surface, inclined at the angle of θ°, and then incident on the light-receiving element surface 1' at an angle of 2θ°, as shown in FIG. 11. The light beam 5 (i.e., the wavefront thereof) is directly incident on the light-receiving element surface 1' approximately perpendicularly. The wavelength of the light beams 4 and 5 is represented by the interval λ at either wavefront.

Assuming that a certain phase of interference fringes, for example, the center of a dark line, lies at a position 10 on the light-receiving element surface 1' and the center of a dark line which is adjacent to the first-mentioned dark line lies at a position 11. Therefore, as will be clear from FIG. 12, the distance between the two points, that is, the interference fringe pitch p, may be expressed by $$p=\lambda/sin2\theta°\approx\lambda/2\theta°(1\gg2\theta°).$$

Accordingly, the interference fringes are produced on the light-receiving element surface 1' in such a manner as to extend in a direction normal to the plane of FIG. 12 (the array direction is parallel to the plane of the figure). FIG. 13 is a perspective view of what is shown in FIG. 10, in which the interference fringes are represented by the lines 6.

Although in the foregoing description the lid surface 2' and the light-receiving element surface 1' are assumed to be perfect planes, in actual practice these surfaces are not perfect planes but slightly undulated relative to each other due to the manufacturing accuracy of the lid 2, for example, or distortion caused by stress applied to the lid 2 when bonded to the package 3, or distortion occurring during the process of producing the light-receiving element 1 or when the light-receiving element 1 is attached to the package 3. Therefore, the interference fringes are correspondingly distorted. From a different point of view, it may be considered that the very small inclination angle θ° shown in FIG. 10 locally represents the relative undulation, that is, inclination, of the lid surface and the light-receiving element surface.

SUMMARY OF THE INVENTION

In view of the above-described problems of the conventional image sensors, it is an object of the present invention to provide an image sensor which is designed so that even in a system that utilizes substantially monochromatic illuminating light of high coherence, no interference fringes are produced on the light-receiving element, or even if interference fringes are produced, the effect thereof on observation or image processing can be satisfactorily reduced.

To attain the above-described object, the present invention firstly provides a$_D$ image sensor which is used in a system that utilizes substantially monochromatic illuminating light of high coherence, and which has a light-receiving element (1) and a protective member (2), which are integrated into one unit, wherein the surface of the light-receiving element is formed with an anti-reflection coating (7) for the illuminating light (4, 5).

Secondly, the present invention provides an image sensor of the type described above, wherein the distance (d) between the surface of the light-receiving element and a surface of the protective member on the side thereof which is closer to the light-receiving element is determined to be not shorter than a half of the coherence length (D) of the illuminating light.

Thirdly, the present invention provides an image sensor of the type described above, wherein the surface of the light-receiving element and the surface of the protective member are inclined relative to each other. Assuming, for example, that the relative inclination angle between the light-receiving element and the protective member with respect to the pixel array direction of the light-receiving element is θ [rad], and the pitch of effective pixels of the light-receiving element, which are valid for signal processing, is P, and further the wavelength of the illuminating light is λ, the inclination angle θ is determined so as to satisfy the following condition:

$$\theta \geq \lambda/2P.$$

The reason for this is as follows: The interference fringe pitch p is p=λ/2θ, as has been described above. Accordingly, as the inclination angle θ becomes larger, the interference fringe spacing becomes narrower. If the arrangement is such that at least one pair of bright and dark interference fringes fall within one pitch p of the effective pixels of the light-receiving element, it is possible to be averaged and thus eliminate a signal output attributable to the interference fringes from each effective pixel. Therefore, we make use of this finding and determine the inclination angle θ to be θ≧λ/2P (P: pixel pitch), as will be detailed later, so that at least one pair of light and dark interference fringes fall within each pixel.

Fourthly, when the above-described image sensor is a two-dimensional area image sensor, the light-receiving element and the protective member are inclined relative to each other with respect to a direction intersecting the grid of effective pixels of the light-receiving element, which are valid for signal processing. It is particularly preferable that the light-receiving element and the protective member be inclined relative to each other with respect to a direction perpendicular to the diagonal of the effective pixels.

It is noted in the present invention that the contrast of interference fringes formed on the light-receiving element depends on the surface reflectivity of the light-receiving element, the coherence of the illuminating light, etc. First, noting that as the intensity of one of the light beams that contribute to the formation of interference fringes (i.e., the light beam that is reflected at the light-receiving element surface and also at the protective member and then enters the light-receiving element) lowers, the contrast of the interference fringes correspondingly lowers and the surface reflectivity of the light-receiving element is reduced in order to lower the intensity of the above-described light beam. That is, an anti-reflection coating is formed on the surface of the light-receiving element. Accordingly, the contrast of the interference fringes on the light-receiving element markedly lowers. In other words, substantially no interference fringes are produced.

Further, noting that as the coherence of the light beams that contribute to the formation of interference fringes is lowered, the contrast of the interference fringes lowers correspondingly, the distance between the surface of the light-receiving element and the light-receiving element-side surface of the protective member is determined to be not shorter than a half of the coherence length of the illuminating light. Accordingly, it becomes unlikely that interference will occur on the light-receiving element (ideally, no interference occurs). Therefore, the image sensor of the present invention is free from the problem of interference fringes.

Further, noting that as the surface of the light-receiving element and the surface of the protective member are inclined relative to each other, the array direction or pitch of interference fringes formed on the light-receiving element changes accordingly, the present invention provides a package in which the light-receiving element and the protective member are integrated into one unit with their respective surfaces inclined relative to each other so that even if interference fringes are produced on the light-receiving element, there will be no obstacle to the observation and measurement carried out by the use of the image sensor. More specifically, as the surface of the light-receiving element and the surface of the protective member are inclined relative to each other, the pitch of the interference fringes decreases in inverse proportion to the degree of inclination. When the interference fringe pitch p becomes equal to or smaller than the pitch P of the effective pixels of the light-receiving element, which are valid for signal processing, at least one pair of bright and dark interference fringes fall within each effective pixel. Therefore, the light intensities of the interference fringes are leveled out (averaged) in each pixel, and the signal output of each pixel that is attributable to the interference fringes is smoothed to a predetermined level. Accordingly, the interference fringes becomes substantially invisible. Thus, the relative inclination angle θ [rad] between the light-receiving element surface and the protective member surface with respect to the pixel array direction of the light-receiving element is determined so as to satisfy the relationship of P≧p=λ/sin 2θ≒λ/2θ(1>>2θ), that is, θ≧λ/2P, where P is the pitch of the effective pixels of the light-receiving element, which are valid for signal processing, and λ is the wavelength of the illuminating light. Accordingly, even if interference fringes are produced, there will be no obstacle to the observation and measurement carried out by the use of the image sensor. When the image sensor is a two-dimensional area image sensor, the light-receiving element and the protective member are inclined relative to each other with respect to a direction intersecting the grid of effective pixels of the light-receiving element, which are valid for signal processing. It is particularly preferable that the light-receiving element and the protective member be inclined relative to each other with respect to a direction perpendicular to the diagonal of the effective pixels. Therefore, even in the case of a two-dimensional area image sensor, interference fringes will not hinder the observation and measurement carried out by the use of the image sensor.

OBJECTS AND EFFECTS OF THE INVENTION

An object of the present invention is to provide an image sensor capable of obtaining an image having substantially no interference fringes even in a system that uses illuminating light of high coherence by preventing occurrence of interference fringes on the light-receiving surface, or by arranging the device such that even if interference fringes are produced, the light intensities of the interference fringes are leveled out (averaged) in the pixels to output a constant level of intensity from each pixel, thereby making the interference fringes unobservable on the electrical output of the image sensor.

Another object of the present invention is to provide an image sensor improved in the accuracy of various observations, image processing and measurement, etc.

BRIEF DESCRIPTION OF THE DRAWINGS

FIGS. 5(a), 5(b) and 5(c) show modifications of the image sensor according to the third embodiment;

DETAILED DESCRIPTION OF THE EMBODIMENTS

Embodiments of the present invention will be described below. It should be noted that an image sensor of each embodiment is used in a mark detecting system (alignment or position measurement system) provided in an apparatus that carries out observation of an object or image processing and measurement by the use of substantially monochromatic illuminating light of high coherence, e.g., a projection exposure apparatus for producing semiconductor devices.

Figure 1:
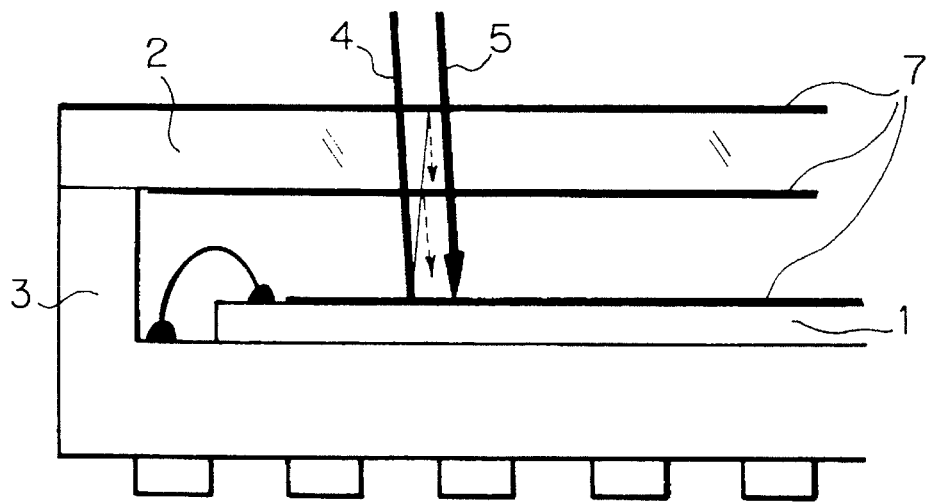
FIG. 1 shows the arrangement of an image sensor according to a first embodiment of the present invention.
Figure 8:
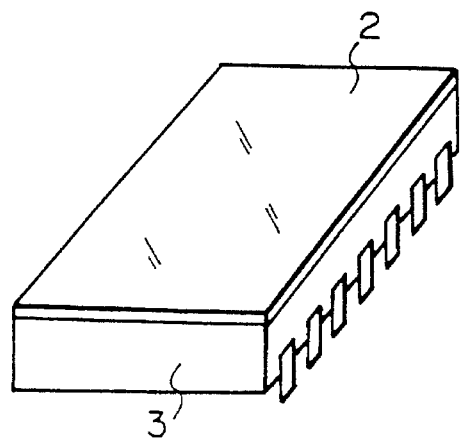
FIG. 8 shows an external appearance of a conventional image sensor.
Figure 9:
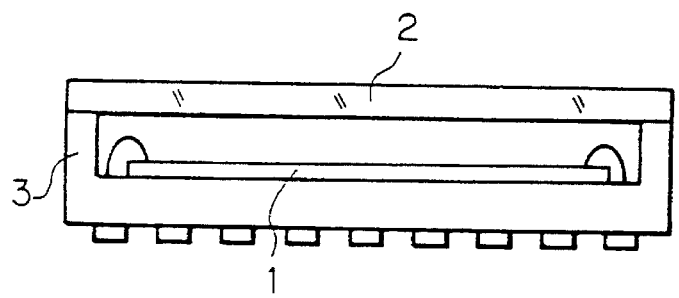
FIG. 9 is a cross sectional view of the image sensor shown in FIG. 8.
Figure 10:
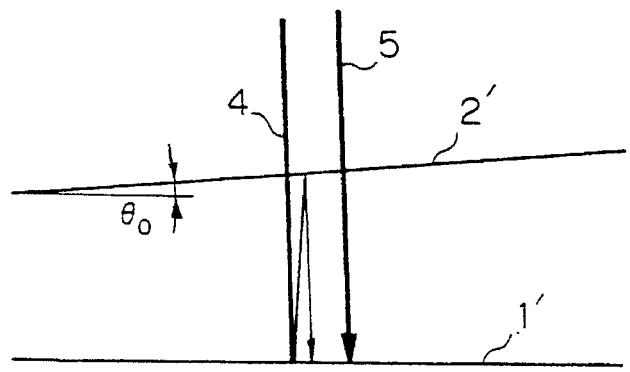
FIG. 10 is a schematic view showing the reason why interference fringes are produced in the conventional image sensor.
Figure 11:
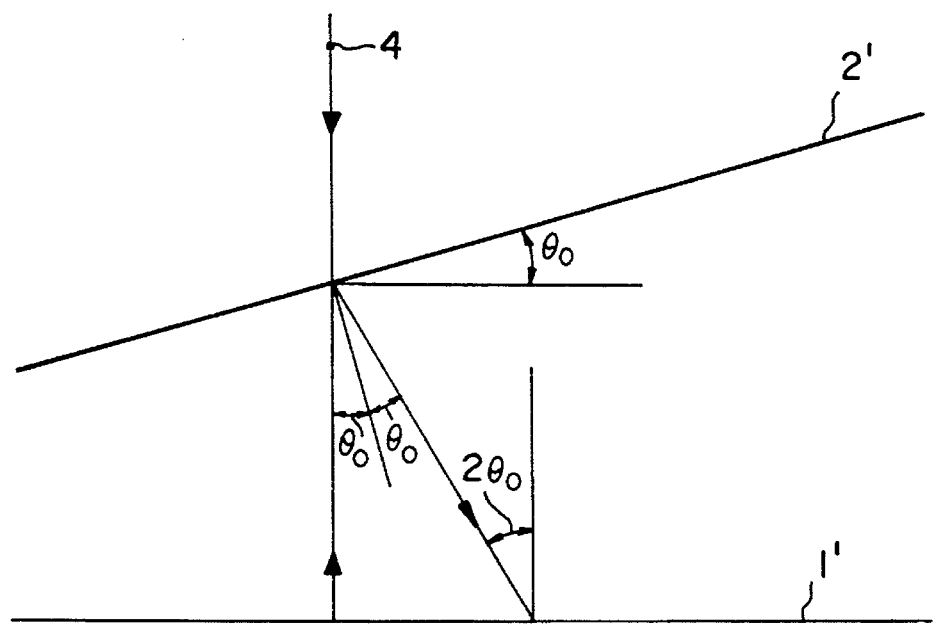
FIG. 11 shows the contents of FIG. 10 in more detail.
Figure 12:
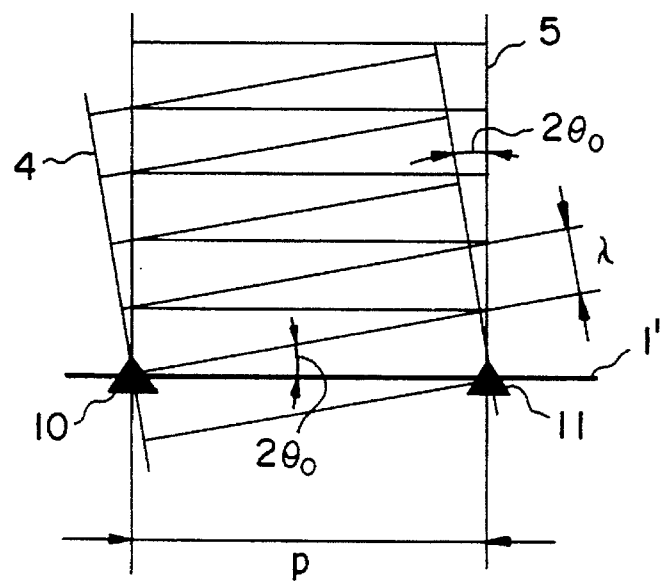
FIG. 12 is a schematic view illustrating the pitch of interference fringes produced as shown in FIG. 10.
Figure 13:
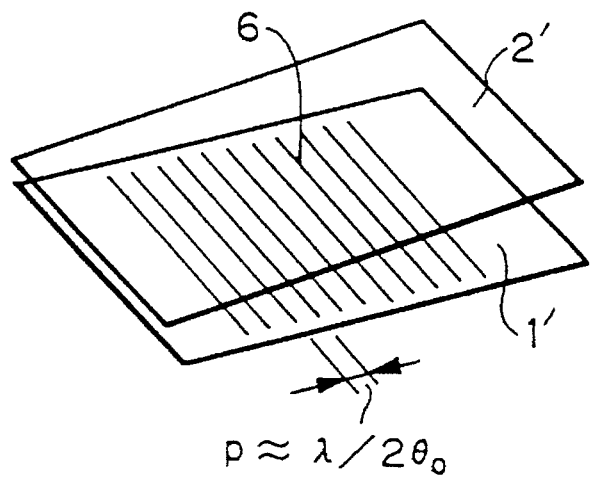
FIG. 13 is a perspective view showing interference fringes produced on the surface of a light-receiving element.

First Embodiment:

FIG. 1 shows the arrangement of an image sensor according to a first embodiment of the present invention. In this figure, members having the same functions as those of the conventional image sensor shown in FIG. 8 are denoted by the same reference numerals. In this embodiment, both surfaces of the protective member (lid) 2 and the surface of the light-receiving element 1 are each formed with an anti-reflection coating 7 adapted for the wavelength region of the illuminating light (e.g., KrF or ArF excimer laser) 4 and 5. An anti-reflection coating for excimer laser may be formed by alternately depositing $Al_2O_3$ and $SiO_2$, for example, by vacuum deposition. It should be noted that the lid 2 is a parallel-sided flat plate glass which is substantially transparent to the illuminating light used, For example quartz glass. Although in FIG. 1 the illuminating light 4 is shown as if it were reflected at an angle for the sake of convenience, it should be noted that in actual practice the illuminating light 4 is approximately perpendicularly incident on the surface of the light-receiving element 1 and reflected approximately perpendicularly.

Figure 14:
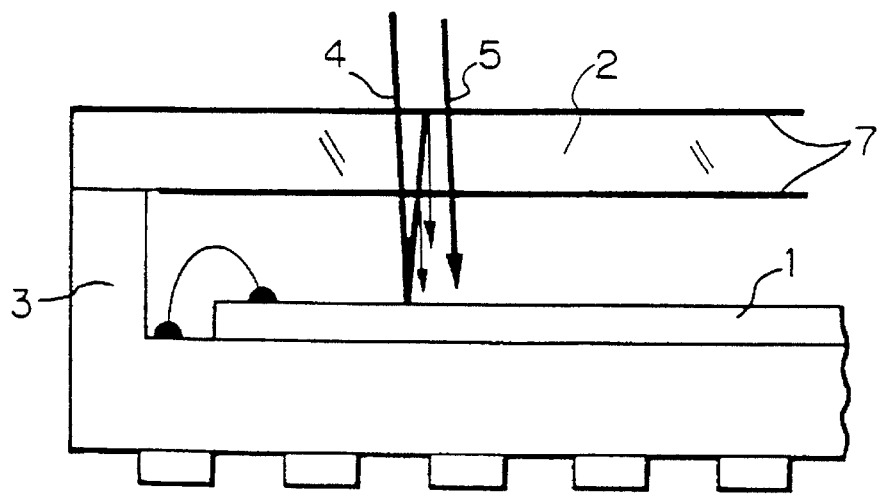
FIG. 14 shows the way in which anti-reflection coatings are formed on both surfaces of the lid shown in FIG. 9.

Thus, in this embodiment, an anti-reflection coating 7 is formed on the surface of the light-receiving element 1 by taking notice of the surface reflectivity of the light-receiving element 1. Accordingly, the intensity of the light beam 4 that passes through the lid 2 and is reflected at the surface of the light-receiving element 1 to reach the lid 2 where it is reflected so as to be incident on the light-receiving element 1 again, that is, the intensity of one of two light beams (4 and 5) which contribute to the formation of interference fringes, can be reduced to a considerable extent in comparison to the conventional image sensor (FIG. 14). The image sensor shown in FIG. 14 has anti-reflection coatings 7 formed on only both surfaces of the lid 2. Accordingly, the contrast of interference Fringes produced on the light-receiving element 1 is markedly lowered, so that the interference fringes constitute no obstacle to observation or image processing and measurement carried out by the use of the image sensor.

Figure 2:
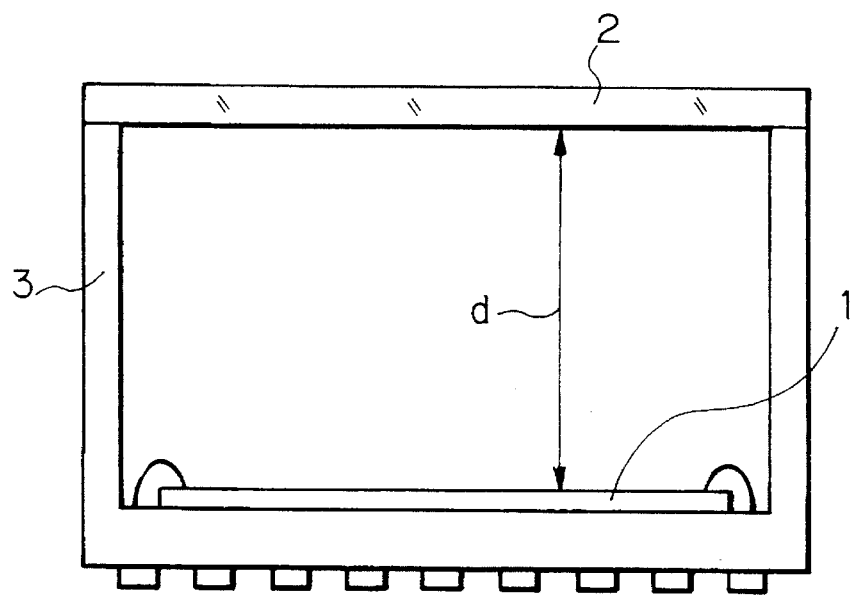
FIG. 2 shows the arrangement of an image sensor according to a second embodiment of the present invention.

Second Embodiment:

FIG. 2 shows the arrangement of an image sensor according to a second embodiment of the present invention. In this figure, members having the same functions as those shown in FIGS. 1 and 8 are denoted by the same reference numerals. In this embodiment, taking notice of the coherence of the illuminating light, the light-receiving element 1 and the lid (parallel-sided flat plate glass) 2 are integrated with the package 3 such that the distance d between the surface of the light-receiving element 1 and the light-receiving element-side surface of the lid 2 is equal to or more than a half of the coherence length D of the illuminating light used. In this case, the height of the package 3 itself may be changed in accordance with the value of the distance d. Alternatively, a spacer may be provided between the package 3 and the lid 2.

Thus, in this embodiment, the distance d between the light-receiving element 1 and the lid 2 is determined to be not shorter than a half of the coherence length D of the illuminating light used. Accordingly, the optical path difference between two light beams that contribute to the formation of interference fringes is not shorter than the coherence length of the illuminating light. That is, no interference between the two light beams occurs, and thus no interference fringes are produced on the light-receiving element 1. It should be noted that anti-reflection coatings similar to those in the first embodiment may be formed on both surfaces of the lid 2 and the surface of the light-receiving element 1 in FIG. 2.

In the case of He-Ne laser or the like, the coherence length is generally several tens of cm or more, so that the size of the image sensor, including the lid, becomes extremely large. Therefore, in such a case, this embodiment is not so practical. However, in the case of excimer lasers that are applied to lithography systems in recent years, the coherence length is in the range of from about 10 mm to several tens of mm at the most. Accordingly, an image sensor of practical size can be produced according to this embodiment, and it is possible to satisfactorily prevent the occurrence of interference fringes. Thus, this embodiment is particularly suitable for an apparatus that uses a laser having a relatively short coherence length.

Figure 3:
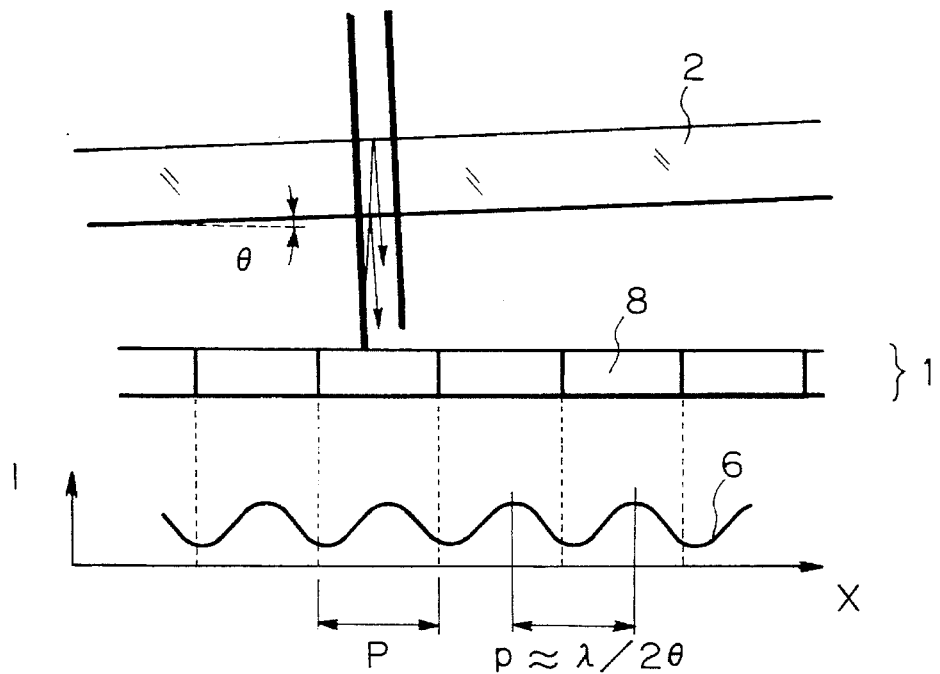
FIG. 3 shows the arrangement of an image sensor according to a third embodiment of the present invention.
Figure 4:
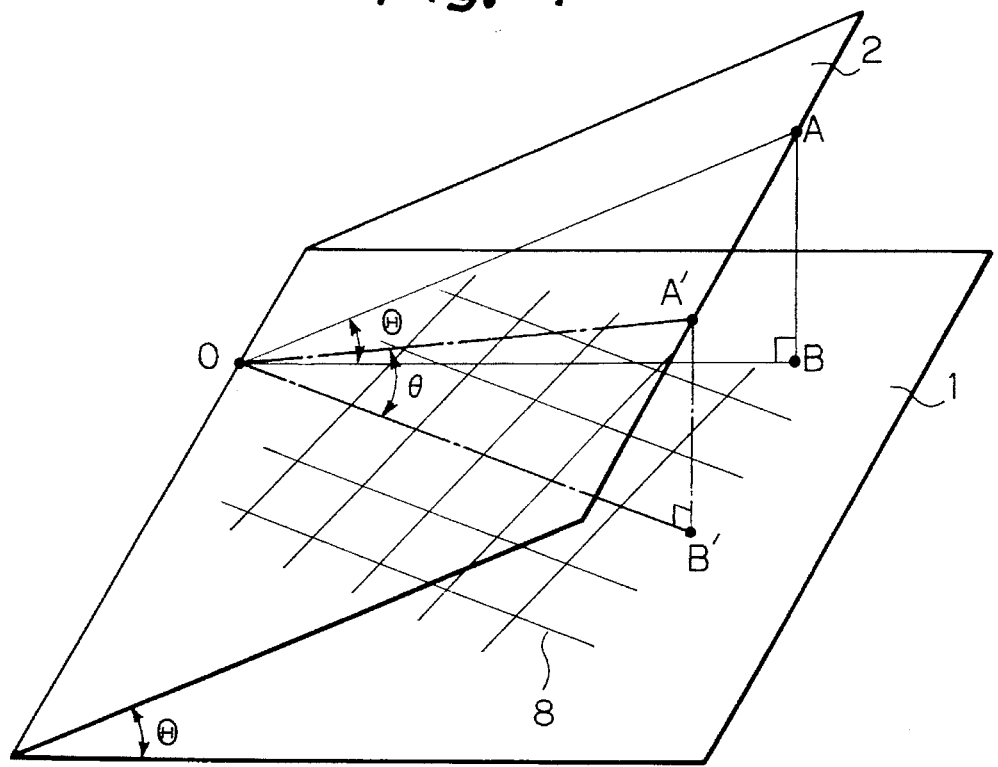
FIG. 4 shows the relationship between the inclination angle $\Theta$ of a lid and the projection angle $\theta$.

Third Embodiment:

FIG. 3 schematically shows the arrangement of an image sensor according to a third embodiment of the present invention. In this figure, members having the same functions as those shown in FIGS. 1 and 2 are denoted by the same reference numerals. In FIG. 3, illustration of a package for supporting the light-receiving element 1 and the lid 2 together as one unit is omitted. In this embodiment, the lid (parallel-sided flat plate glass) 2 is attached to the package at a very small angle $\theta$ [rad] of inclination with respect to the surface of the light-receiving element 1, thereby inclining the light-receiving element surface and the lid surface relative to each other. It should be noted that the inclination angle $\theta$ is an angle determined by projecting the actual inclination angle $\Theta$ of the lid 2 in a direction perpendicular to the array direction (horizontal direction within the plane of the figure) of the pixels 8 of the light-receiving element 1. That is, what is important in this embodiment is not the actual inclination angle $\Theta$ of the lid 2 but the relative inclination angle $\theta$ between the light-receiving element surface and the lid surface with respect to the pixel array direction (i.e., the projection component of the inclination angle $\Theta$). The relationship between the inclination angle $\Theta$ and the projection component $\theta$ thereof is shown in FIG. 4. The actual inclination angle $\angle AOB$ between the light-receiving element 1 and the lid 2 is $\Theta$. Reference numeral 8 denotes a grid of pixels of the image sensor. The grid 8 of pixels of the image sensor is not always parallel to the light-receiving element surface. Let us assume that the grid 8 of pixels is at an angle to the light-receiving element surface. When a perpendicular is drawn from the lid 2 in accordance with the direction of the pixels as shown in the figure, in a case where the grid 8 and the light-receiving element surface are not parallel to each other, the angle $\angle A'OB'$ made by the light-receiving element 1 and the lid 2 with respect to the pixels 8 is $\theta$, that is, $\Theta \neq \theta$.

As has been described above, the pitch p of the interference fringes 6 may be expressed by $p = \lambda/\sin 2\theta \approx \lambda/2\theta (1 >> 2\theta)$, where $\lambda$ is the wavelength of the illuminating light used. If the pitch p of the interference fringes 6 is not larger than the pitch P of the pixels 8, at least one pair of light and dark interference fringes fall within in each pixel. Accordingly, the light intensities of interference fringes in each pixel are leveled out (averaged) to a predetermined level. Since the light intensities of the interference fringes are leveled out (averaged) in the pixels, the interference fringes become substantially invisible. Therefore, the lid 2 is inclined so that the relationship of the interference fringe pitch p to the pixel array pitch P is $p \leq P$, that is, the condition of $\theta \geq \lambda/2P$ is satisfied. Thus, in this embodiment, although interference fringes are present on the light-receiving element 1, the light intensities of the interference fringes are leveled out (averaged) in each pixel 8. Therefore, the interference fringes are substantially unobservable on the output of the image sensor and thus constitute no obstacle to observation or image processing and measurement carried out by the use of the image sensor. It should be noted that in this embodiment the lid 2 may be inclined in any desired manner as long as the above-described condition is satisfied. To secure the lid 2 to the package 3 at an angle of inclination, any of the following methods may be adopted: the height of the package 3 is locally changed in accordance with the inclination angle $\theta$ ($\Theta$, to be precise); the package 3 is formed with its height sloped so as to provide the inclination angle $\theta$; a spacer is locally provided in between the package 3 and the lid 2; the thickness of an adhesive used to secure the lid 2 to the package 3 is locally changed; and the thickness of the lid 2 is locally varied at portions thereof which are brought into contact with the package 3. It should be noted that the package 3 is formed of a ceramic or resin material by molding process. The pixels of the light-receiving element 1 in this embodiment are assumed to be effective pixels of the light-receiving element 1, which are valid for signal processing. In this embodiment also, anti-reflection coatings may be formed on the surface of the light-receiving element 1 and at least one surface of the lid 2 in the same way as in the first embodiment.

Incidentally, when the pixel array pitch P in this embodiment is 12 μm and the illuminating light wavelength $\lambda$ is 0.248 μm, the inclination angle $\theta$ should be determined to be larger than about 10 mrad (=0.59°). When the inclination angle $\theta$ is set at 10 mrad, $p \approx P$, so that a pair of bright and dark fringes are superimposed on each pixel 8 of the light-receiving element 1, as shown in FIG. 3. Consequently, the light and dark fringes are leveled out in the pixel 8 to become substantially unobservable. In actuality, however, a moiré pattern may be observed because the interference fringe pitch may be locally varied owing to the distortion, deflection, undulation, etc. of the lid 2 or because of a fine displacement between the pixels of the image sensor and the interference fringe pitch. For this reason, there are cases where only one interference fringe falls within one pixel, and where one pixel contains not more than one interference fringe because of the distortion or other deformation of the lid. Accordingly, for the sake of security, it is preferable to make the inclination angle $\theta$ larger than $\lambda/2P$ and to thereby make the interference fringe pitch finer so that a plurality of interference fringes (light and dark fringes), e.g., 2 or 3 interference fringes, fall within each pixel. When the inclination angle $\theta$ is to be made larger than $\lambda/2P$, it is preferable to properly adjust the angle characteristics of the anti-reflection coatings on the lid 2 in accordance with the inclination angle $\theta$, that is, the actual inclination angle $\Theta$ of the lid 2.

In this embodiment, the description is made on the assumption that the image sensor is a one-dimensional linear image sensor. Thus, the lid 2 should be inclined so that the above-described condition ($\theta \geq \lambda/2P$) is satisfied in all cases except for a case where the direction of inclination of the lid 2 (i.e., the pitch direction of the interference fringes 6) and the pixel array direction intersect perpendicularly to each other. When the two directions intersect perpendicularly to each other, however, it is necessary to incline the lid 2 by taking notice of the width W of the pixels, which is concerned with the direction perpendicular to the pixel array direction. That is, it is necessary to incline the lid 2 when secured to the package 3 so that the interference fringe pitch p is not larger than the width W of the pixels, i.e., the condition of $p \leq W$ is satisfied. In other words, the lid 2 should be inclined so that the inclination angle $\theta$ satisfies the condition of $\theta \geq \lambda/2W$. It should be noted that when the image sensor is a two-dimensional area image sensor, the lid 2 should be inclined so that each of the inclination angles (projection portions of the inclination angle $\Theta$) $\theta$ with respect to two pixel array directions which intersect perpendicularly to each other on the light-receiving element 1 satisfies the above-described condition. Even if the pixel array pitches in the two pixel array directions are different from each other, the lid 2 should similarly be inclined so that each inclination angle θ satisfies the above-described condition.

In this embodiment, the lid 2 is a parallel-sided flat plate, which is attached to the package at an angle of inclination with respect to the surface of the light-receiving element 1. However, the lid 2 which is formed in a wedge shape may be attached to the package, as shown in FIG. 5(a). Alternatively, the light-receiving element 1 may be attached to the package at an angle of inclination with respect to it, as shown in FIG. 5(b). It is also possible to incline both the light-receiving element 1 and the lid 2, as shown in FIG. 5(c). The essential thing is to incline the light-receiving element 1 and the lid 2 relative to each other so that the inclination angle θ between the light-receiving element surface and the lid surface satisfies the above-described condition; the light-receiving element 1 and the lid 2 may be attached to the package in any desired manner.

Figure 6A:
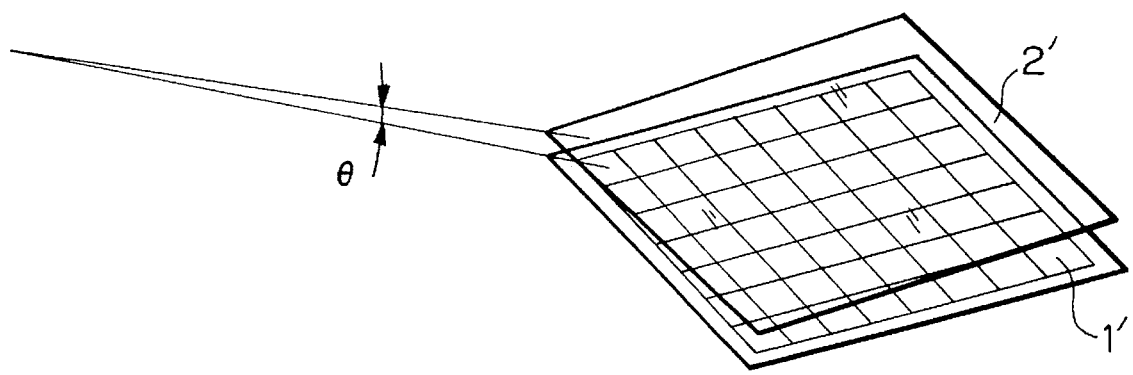
FIGS. 6(a) and 6(b) show the arrangement of an image sensor according to a fourth embodiment of the present invention.
Figure 6B:
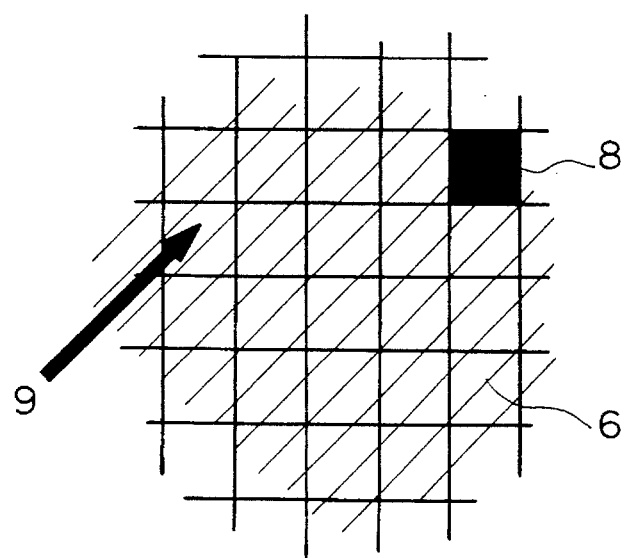

Fourth Embodiment:

FIGS. 6(a) and 6(b) schematically show the arrangement of an image sensor according to a fourth embodiment of the present invention. In these figures, members having the same functions as those shown in FIGS. 1 to 3 are denoted by the same reference numerals. In FIGS. 6(a) and 6(b), an illustration of a package for supporting the light-receiving element 1 and the lid 2 together as one unit is omitted. This embodiment is particularly effective for a two-dimensional area image sensor, in which the light-receiving element surface and the lid surface are inclined relative to each other in the same way as in the third embodiment.

In this embodiment, the light-receiving element surface 1' and the lid surface 2' are inclined relative to each other at angle θ, as shown in FIG. 6(a). In this case, the light-receiving element 1 and the lid 2 are attached so that the longitudinal direction [i.e., the direction of the arrow 9 in FIG. 6(b)] of the light and dark patterns of interference fringes 6 produced on the light-receiving element 1 is approximately parallel to the diagonal (i.e., the 45° direction of the pixel grid). With this arrangement, since the angle of intersection of the interference fringes and the pixels 8 is the same regardless of whether the light-receiving element 1 is viewed length-wise or breadthwise, the effect of leveling the light intensities of the interference fringes is identical in the lengthwise and breadthwise directions. Thus, the ease of observation is not limited to one direction. In this embodiment also, anti-reflection coatings may be formed on the surface of the light-receiving element 1 and at least one surface of the lid 2 in the same way as in the first embodiment.

Although in this embodiment the interference fringes 6 intersect the pixel grid on the light-receiving element 1 at 45°, it should be noted that the angle of intersection is not necessarily limited to 45° but may be properly determined in accordance with the pitch of the interference fringes 6, for example. That is, since the number of bright and dark fringes falling within each pixel 8 is determined by the pitch of the interference fringes 6, the angle of intersection should be adjusted according to how many pairs of bright and dark fringes are to fall within each pixel. It is necessary to determine the angle of intersection so that at least one pair of bright and dark fringes fall within each pixel. When at least one pair of bright and dark fringes cannot fall within each pixel because the pitch of the interference fringes 6 is coarse, the interference fringe pitch should be made finer by increasing the inclination angle θ. In other words, it is also preferable in this embodiment to incline the light-receiving element surface and the lid surface so that the inclination angle θ satisfies the condition of $\theta \geq \lambda/2P$ in the same way as in the third embodiment.

Thus, in this embodiment, the light-receiving element 1 and the lid 2 are attached to the package with the light-receiving element surface and the lid surface inclined relative to each other with respect to a direction intersecting the pixel grid so that the interference fringes 6 intersect the two-dimensional grid of pixels on the light-receiving element 1. Accordingly, substantially no interference fringes are observable even in the case of a two-dimensional area image sensor.

Figure 7A:
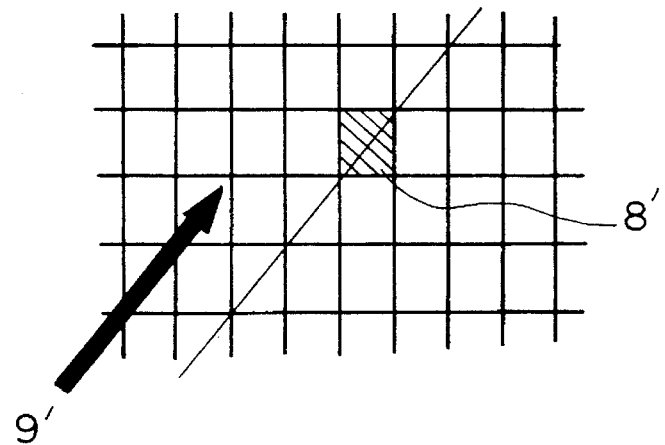
FIGS. 7(a), 7(b) and 7(c) show modifications of the image sensor according to the fourth embodiment.
Figure 7B:
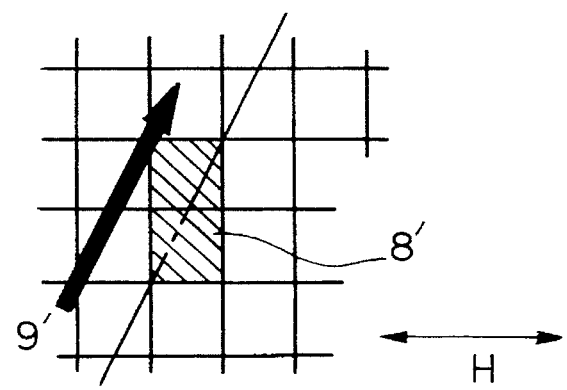
Figure 7C:
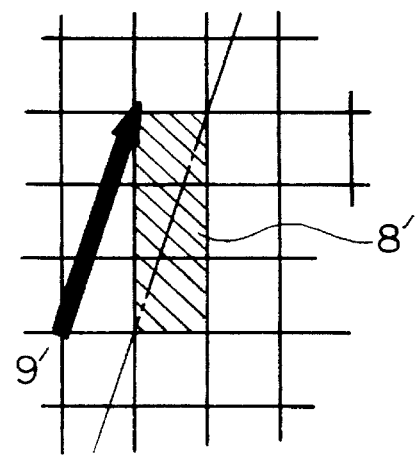

Incidentally, although in FIGS. 6(a) and 6(b) the pixels 8 are represented by squares, pixels are not always square in actual image sensors. Pixels may be rectangular as shown in FIG. 7(a). When, as shown in FIG. 7(b), two pixels which line up in a direction perpendicular to the horizontal scanning line (the arrow H) are used together in the inter-line scanning (inter-laced scanning), or when two or more adjacent pixels are used together for the convenience of image processing, as shown in FIG. 7(c), even if each pixel is square, the effective pixels for signal processing are rectangular. As shown in FIGS. 7(a) to 7(c), when the effective pixel (i.e., the hatched portion in each figure) 8' is rectangular, the angle of intersection of interference fringes and the pixel grid is determined so that interference fringes occur in parallel to the diagonal (solid line in each figure) of the effective pixel 8' for signal processing. That is, the light-receiving element 1 and the lid 2 are attached to the package with the light-receiving element surface and the lid surface inclined relative to each other so that the longitudinal direction 9' of the bright and dark patterns of interference fringes and the diagonal of the effective pixel 8' are parallel to each other. By doing so, it is possible to obtain the same advantageous effects as those in the fourth embodiment (FIG. 6).

Next, an apparatus to which the image sensor of the present invention may be applied will be explained with reference to FIG. 15. In the following, an example of application to a mark detecting system provided in a projection exposure apparatus for manufacturing semiconductor devices will be described. In the apparatus shown in FIG. 15, KrF excimer laser light is assumed to be used as illuminating light for exposure.

Figure 15:
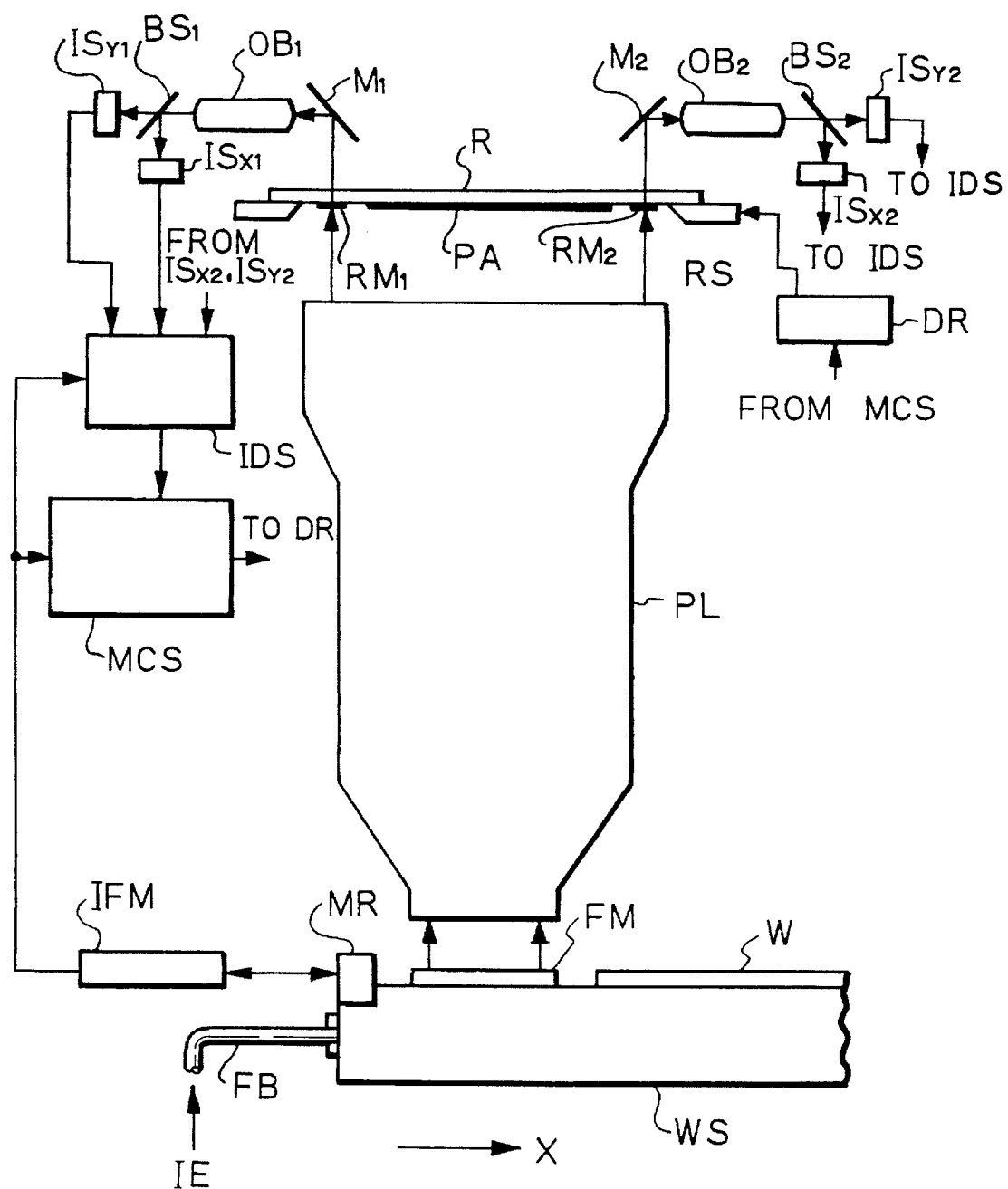
FIG. 15 schematically shows a reduction projection exposure apparatus having a mark position measurement system to which the image sensor of the present invention may be applied.

Referring to FIG. 15, the illuminating light passing through a pattern area PA of a reticle R enters a projection optical system PL. The projection optical system PL projects an image of the reticle pattern onto a wafer W. The reticle R is mounted on a reticle stage RS which is movable in X, Y and θ directions by a driving system DR. The position of the reticle R can be constantly monitored with a laser interferometer (not shown). Two alignment marks $RM_1$ and $RM_2$ are disposed to face each other in the peripheral portion of the reticle R. The alignment marks $RM_1$ and $RM_2$ are, although not shown, cross-shaped light-blocking marks each formed in a rectangular transparent window. The wafer W is monitored on a two-dimensionally movable wafer stage WS, and the position of the wafer W is measured at all times with a laser interferometer IFM. The wafer stage WS is provided with a moving mirror MR for reflecting a laser beam from the interferometer IFM, and a reference plate FM used for reticle alignment, base line measurement, etc.

Figure 16A:
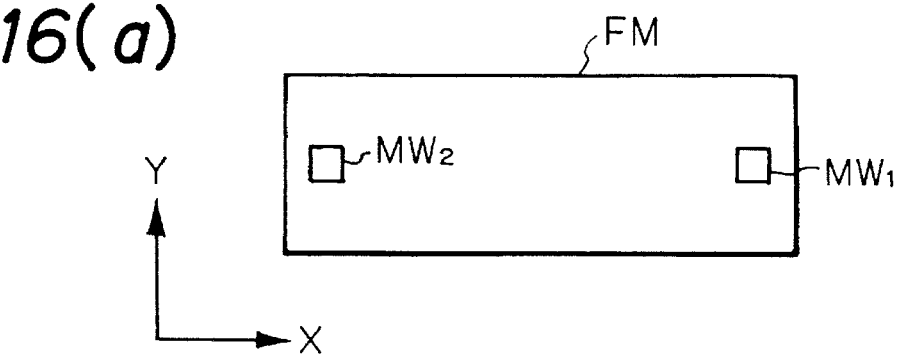
FIGS. 16(a) and 16(b) show specific arrangements of a reference plate shown in FIG. 15.
Figure 16B:
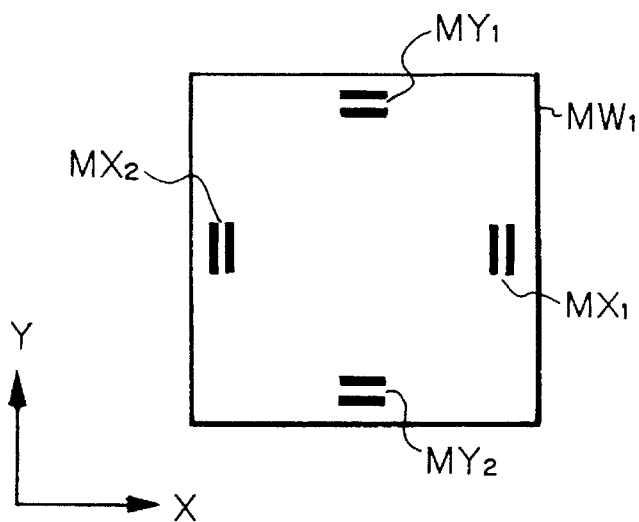

FIG. 16(a) shows a specific arrangement of the reference plate FM. The reference plate FM is formed with two transparent windows $MW_1$ and $MW_2$ which are spaced apart from each other in the X direction by a predetermined distance. The spacing between the transparent windows $MW_1$ and $MW_2$ is determined by multiplying the spacing between the alignment marks $RM_1$ and $RM_2$ on the reticle R by the projection magnification of the projection optical system PL. As shown in FIG. 15, the reference plate FM is illuminated from the lower side thereof with illuminating light IE transmitted to the inside of the wafer stage WS by the use of an optical fiber FB. The illuminating light IE which is in the same wavelength region as the illuminating light for exposure is used. In this arrangement, a part of KrF excimer laser light emitted from a light source for exposure is branched to enter one end of the optical fiber FB. FIG. 16(b) is an enlarged view of the transparent window $MW_1$. The transparent window $MW_1$ is formed therein with four reference marks $MX_1$, $MX_2$, $MY_1$ and $MY_2$. Each reference mark is composed of two straight line-shaped light-blocking marks. Since the arrangement of the transparent window $MW_2$ is the same as that of the transparent window $MW_1$, description thereof is omitted.

Next, the mark detecting system provided in the projection exposure apparatus shown in FIG. 15 will be explained. Referring to FIG. 15, the reference plate FM is set in a predetermined position by moving the wafer to stage WS. Thereafter, the illuminating light IE from the optical fiber FB is applied to the lower side of the reference plate FM. The illuminating light IE passing through the transparent windows $MW_1$ and $MW_2$ of the reference plate FM reaches the reticle R through the projection optical system PL. Thus, images of the transparent windows $MW_1$ and $MW_2$ are formed on the alignment marks $RM_1$ and $RM_2$, respectively. Further, light passing through the alignment mark $RM_1$ reaches a beam splitter (half-mirror) $BS_1$ via a mirror $M_1$ and a relay lens system $OB_1$. In the beam splitter $BS_1$, the light is split into two beams, which enter two imaging devices $IS_{X1}$ and $IS_{Y1}$, respectively. Meanwhile, light passing through the alignment mark $RM_2$ travels via a mirror $M_2$, an objective and relay lens system $OB_2$ and a beam splitter $BS_2$ and enters imaging devices $IS_{X2}$ and $IS_{Y2}$. The relay lens system $OB_1$ is a magnifying system for forming the images of the alignment mark $RM_1$ and the transparent window $MW_1$ on the light-receiving surfaces of the imaging devices $IS_{X1}$ and $IS_{Y1}$ again. It should be noted that the relay lens system $OB_2$ functions in a similar manner to the relay lens system $OB_1$. It is assumed that each of the four imaging devices $IS_{X1}$, $IS_{Y1}$, $IS_{X2}$ and $IS_{Y2}$ employs the image sensor (FIG. 1) of the first embodiment, for example.

Figure 16C:
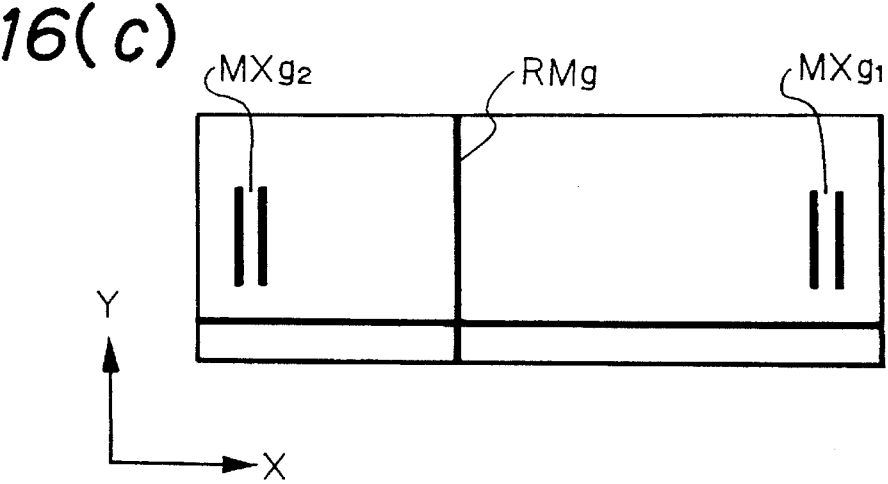
FIG. 16(c) shows mark images detected by an imaging device shown in FIG. 15.

FIG. 16(c) shows mark images detected by the imaging device $IS_{X1}$. As illustrated in the figure, an image Rmg of the alignment mark $RM_1$ is detected as interposed between images $MXg_1$ and $MXg_2$ of the reference marks $MX_1$ and $MX_2$. At this time, there is no likelihood that interference fringes will be observed together with these mark images. An image signal processing circuit IDS inputs an image signal from the imaging device $IS_{X1}$ and calculates a relative misalignment quantity in the X direction between the alignment mark $RM_1$ and the reference marks $MX_1$ and $MX_2$ by predetermined arithmetic processing. In the imaging device $IS_{Y1}$, images of the alignment mark $RM_1$ and the reference marks $MY_1$ and $MY_2$ are detected, and a relative misalignment quantity in the Y direction is calculated in the image signal processing circuit IDS. It should be noted that image signals from the imaging devices $IS_{X2}$ and $IS_{Y2}$ are also input to the image signal processing circuit IDS where relative misalignment quantities in the X and Y directions between the alignment mark $RM_2$ and the transparent window $MW_2$ are calculated. A main controller system MCS inputs the misalignment quantities calculated in the image signal processing circuit IDS and calculates residual errors in the X, Y and θ directions of the reticle R on the basis of these misalignment quantities. Then, the main controller system MCS finely adjusts the reticle stage RS through the driving system DR so that the residual errors become zero. Thus, the alignment of the reticle R is completed.

When the image sensor of the present invention is applied to the mark detecting system of the projection exposure apparatus as described above, the mark detecting accuracy can be improved to a considerable extent because the detection is not affected by interference fringes. Accordingly, the use of the image sensor of the present invention is considerably useful for the projection exposure apparatus in which the requirement for the accuracy is strict.

Although in the foregoing the image sensor of the present invention is employed as each of the four imaging devices $IS_{X1}$, $IS_{Y1}$, $IS_{X2}$ and $IS_{Y2}$ in FIG. 15, there is a method whereby the effect of interference fringes can be reduced even if the conventional image sensors are used as they are. For example, if an imaging device and interference fringes produced on the light-receiving surface of the imaging device are moved (or vibrated) relative to each other during imaging, the interference fringes are leveled out as a whole, so that the effect of the interference fringes can be reduced to a considerable extent. In this case, the direction of the relative movement is preferably a direction intersecting the pitch direction of the interference fringes produced on the light-receiving surface. The relative movement may be realized, for example, by finely changing the angle of the imaging device, or by vibrating the beam splitter $BS_1$. Alternatively, the arrangement may be such that a vibrating mirror is disposed on or near a Fourier transform plane with respect to the light-receiving surface of the imaging device, and the vibrating mirror is pivoted during imaging. At this time, the light-receiving surface of the imaging device and each mark image do not move relative to each other, but the interference fringes move synchronously with the pivoting motion of the vibrating mirror. Thus, the light intensities of interference fringes can be leveled out for each pixel.

In addition to the method wherein the interference fringes are moved during imaging, it is also possible to employ a method wherein an average image over a plurality of fields is used for image processing, and for each field a different interference fringe image is taken in and the output thereof is added, thereby reducing the effect of interference fringes.

The present invention may be carried out in various other forms without departing from the spirit and principal features thereof. Accordingly, the foregoing embodiments are merely illustrative examples in all respects and should not be limitatively construed. The scope of the present invention is limited solely by the appended claims and by no means bound by the text of the specification. Further, it should be noted that all modifications and changes that belong to equivalents of the appended claims fall within the scope of the present invention.

What is claimed is:

1. An image sensor used with substantially monochromatic illuminating light of high coherence, said image sensor comprising:

an illuminating light receiving element; and a protective member integrated with said element to cover it, said protective member being substantially transparent to said illuminating light, wherein a surface of said element and a surface of said protective member are inclined relative to each other by a predetermined angle θ, which is defined with respect to a pixel array direction of said element so as to satisfy the following condition:

$$\theta \geq \lambda/2P$$

where P is the pitch of effective pixels of said element, which are valid for signal processing, and λ is the wavelength of said illuminating light.

2. An image sensor according to claim 1, further comprising a support member for supporting said element and said protective member together as one unit, said support member having a surface for installing said protective member, said installation surface being inclined with respect to a light-receiving surface of said element.

* * * * *